(12) United States Patent
Efimov

(10) Patent No.: US 7,310,183 B1
(45) Date of Patent: Dec. 18, 2007

(54) DIFFRACTIVE OUTCOUPLER FOR SECOND HARMONIC GENERATION

(75) Inventor: Oleg M. Efimov, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 11/607,332

(22) Filed: Nov. 30, 2006

(51) Int. Cl.
*G02F 2/02* (2006.01)

(52) U.S. Cl. ....................................... 359/328; 359/575

(58) Field of Classification Search ............... 359/326, 359/328, 329, 563, 568, 575, 572; 385/37; 372/102

See application file for complete search history.

(56) References Cited

U.S. PATENT DOCUMENTS 5,157,537 A * 10/1992 Rosenblatt .................. 359/245
5,418,882 A * 5/1995 Ortiz, Jr. ..................... 372/20

OTHER PUBLICATIONS

T. D. Raymond, et al., "Intracavity frequency doubling of a diode-pumped external-cavity surface-emitting semiconductor laser," *Optics Letters*, Aug. 15, 1999, pp. 1127-1129, vol. 24, No. 16.

E. U. Rafailov, et al., "Efficient frequency doubling of a vertical-extended-cavity surface-emitting laser diode by use of a periodically poled KTP crystal," *Optics Letters*, Nov. 1, 2003, pp. 2091-2093, vol. 28, No. 21, Optical Society of America.

Eckart Schiehlen, et al., Diode-Pumped Semiconductor Disk Laser With Intracavity Frequency Doubling Using Lithium Triborate (LBO), *IEEE Photonics Technology Letters*, Jun. 2002, pp. 777-779, vol. 14, No. 6, IEEE.

Yung S. Liu, et al., "High-average-power intracavity second-harmonic generation using $KTiOPO_4$ in an acousto-optically Q-switched Nd:YAG laser oscillator at 5 kHz," *Optics Letters*, Mar. 1984, pp. 76-78, vol. 9, No. 3, Optical Society of America.

* cited by examiner

*Primary Examiner*—Hemang Sanghavi
(74) *Attorney, Agent, or Firm*—Christie, Parker, Hale

(57) ABSTRACT

A diffractive outcoupler, for use in a cavity of a laser, includes a surface phase grating for receiving radiation from a laser source and has rectangular grooves with a depth D, a first reflector located to receive a first diffracted portion of the radiation from the grating and to reflect the first diffracted portion back toward the grating, and a second reflector located to receive a second diffracted portion of the radiation from the grating and to reflect the second diffracted portion back toward the grating. The depth D of the grooves satisfies a relationship with the refractive index of the grating to permit transmission of the second harmonic of the radiation through the grating while causing portions of the first harmonic passing through the grooves and elevations of the grating to destructively interfere.

20 Claims, 3 Drawing Sheets

DIFFRACTIVE OUTCOUPLER FOR SECOND HARMONIC GENERATION

BACKGROUND OF THE INVENTION

1. Field of the Invention

This invention relates to generation of second harmonics from lasers and more particularly to diffractive outcouplers for generation of second harmonics from lasers and for intracavity generation of second harmonics from lasers.

2. Description of Related Art

Intracavity second harmonic generation is a very efficient method for converting energy from the fundamental frequency to its second harmonic. Typically, two mirrors of approximately 100% reflectivity at the fundamental frequency are used as laser end mirrors to reach a maximum power density of radiation inside of a cavity. A nonlinear crystal, that has a high transmission at the frequency of the second harmonic, is placed inside the cavity and near one of the mirrors for second harmonic generation. The end mirrors are usually implemented using a distributed Bragg reflector that is a Bragg grating and assists in the narrowing of the laser radiation spectrum. Thus, mostly the radiation of second harmonics can leave the cavity. This method of second harmonic generation is therefore very efficient, particularly when high power and narrowband radiation from a laser are available, such as with a Nd:YAG laser oscillator. Nd:YAG lasers typically emit light with a wavelength of 1064 nm, in the infrared.

For wideband radiating lasers, such as semiconductor lasers, however, the spectrum of oscillation is wider than the acceptance bandwidth of crystal for frequency doubling. This prevents obtaining highly efficient energy conversion through the above intracavity second harmonic generation method. In particular, the wide bandwidth of a surface-emitting semiconductor laser (>1 nm) has been found to result in low conversion efficiency despite the use of a distributed Bragg reflector as one of the mirrors. High reflective thin distributed Bragg reflectors in semiconductor lasers have a rather wide band (>10 nm) and flat-topped spectral reflection. So, a surface-emitting semiconductor, even when used with distributed Bragg reflectors, cannot provide sufficiently stable and narrowband oscillation for the laser. Further, the laser tends not to operate near the phase-matching wavelength because the laser gain is highly homogeneous and the nonlinear losses are maximized for phase-matched wavelengths.

To stabilize the wavelength and bandwidth of the semiconductor laser oscillation, an etalon with a thickness of 100-200 μm may be introduced into the cavity. However, etalons have many maximums of transmission in spectral space, which are separated from each other by intervals of a few nanometers. Therefore, instead of being monochromatic, a laser including an etalon tends to oscillate by a few spectral lines when operated under the high power needed for efficient second harmonic generation. For such wide bandwidth active media, therefore, strong narrowband frequency stabilization is needed for high efficiency intracavity second harmonic generation.

SUMMARY OF THE INVENTION

Embodiments of the present invention provide a diffractive outcoupler for use in a cavity of a laser. The diffractive outcoupler includes a transparent substrate, a surface phase grating, a first reflector and a second reflector. The transparent substrate has a first side and a second side. The surface phase grating includes rectangular grooves formed on the first side. The surface phase grating divide incident radiation into a transmitted portion, a first diffracted portion, and a second diffracted portion. The first reflector is situated with respect to the transparent substrate to receive the first diffracted portion from the surface phase grating and to reflect the first diffracted portion back toward the surface phase grating. The second reflector is situated with respect to the transparent substrate to receive the second diffracted portion from the surface phase grating and to reflect the second diffracted portion back toward the surface phase grating. The grooves have a groove depth D that substantially satisfies the relation $D=\lambda(k+1/2)/(n_{FH}-1)$, where k is a nonnegative integer, $\lambda$ is a fundamental wavelength of the incident radiation, and $n_{FH}$ is refractive index of the transparent substrate at the fundamental wavelength $\lambda$.

Embodiments of the present invention also provide a second harmonic generation system. The second harmonic generation system includes a cavity, an active element, a first reflector, a harmonic generator, a substrate, a second reflector, and a third reflector. The active element is located within the cavity for generating radiation and the first reflector is located within the cavity adjacent a first side of the active element. The harmonic generator is located within the cavity adjacent a second side of the active element to receive the radiation from the active element. The substrate has a first substrate side and a second substrate side opposite the first substrate side. The first substrate side includes a surface phase grating for receiving the radiation from the harmonic generator. The second reflector is located to receive a first diffracted portion of the radiation from the surface phase grating and to reflect the first diffracted portion back toward the surface phase grating. The third reflector is located to receive a second diffracted portion of the radiation from the surface phase grating and to reflect the second diffracted portion back toward the surface phase grating. The surface phase grating includes rectangular grooves having a groove depth D. The groove depth D substantially satisfies the relation $D=\lambda(k+1/2)/(n_{FH}-1)$, where k is a nonnegative integer, $\lambda$ is a fundamental wavelength of the radiation, and $n_{FH}$ is refractive index of the substrate at the fundamental wavelength.

Embodiments of the present invention also provide a method for spectral selection of second harmonic from radiation generated at fundamental harmonic by laser sources. The method includes transmitting the radiation onto a transparent substrate. The transparent substrate has a first side and a second side and a surface phase grating formed on the first side. The surface phase grating divides the radiation into a transmitted portion, a first diffracted portion, and a second diffracted portion. The method also includes reflecting the first diffracted portion back toward the surface phase grating by a first reflector and reflecting the second diffracted portion back toward the surface phase grating by a second reflector. The surface phase grating includes rectangular grooves having a groove depth D. The groove depth D substantially satisfies the relation $D=\lambda(k+1/2)/(n_{FH}-1)$, where k is a nonnegative integer, $\lambda$ is a fundamental wavelength of the radiation, and $n_{FH}$ is refractive index of the transparent substrate at the fundamental wavelength $\lambda$ of the radiation. The transmitted portion is substantially at a second harmonic frequency of the radiation. Intensity of the transmitted portion is substantially equal to intensity of the radiation transmitted onto the transparent substrate.

DETAILED DESCRIPTION

Figure 1:
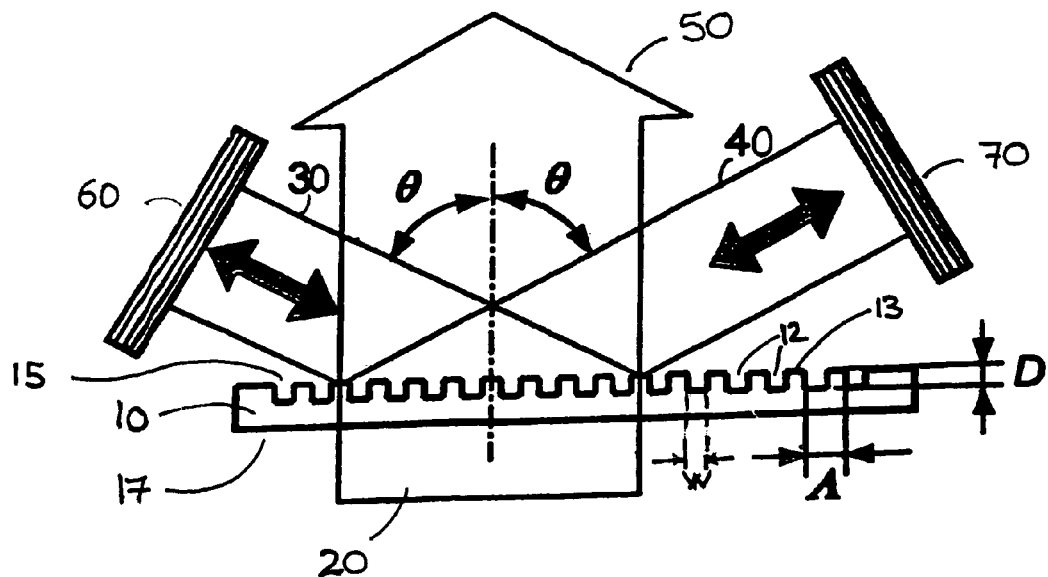
FIG. 1 is a schematic side view of one embodiment of a diffractive outcoupler according to the present invention.

One embodiment of the present invention includes an outcoupler that has a plane phase grating according to embodiments of the present invention. Conventional plane phase gratings usually have considerable diffraction efficiency for a wide interval of wavelengths and rather high intensity of non-diffracted (transmitted) beam. This means that both the basic radiation of the laser and the radiation of second harmonic should be partially transmitted through the grating and partially diffracted on it. Therefore, the conventional plane phase grating should result in losses at both wavelengths instead of enhancing the radiation at one wavelength and diminishing it at the other wavelength. A special grating, according to the embodiments of the present invention, allows strong suppression of the transmitted beam at the fundamental frequency of radiation and strong suppression of diffraction at the frequency of second harmonic.

If a laser beam having a fundamental wavelength $\lambda$ is transmitted to be normally incident upon a phase diffractive grating with period of $\Lambda$, the incident beam experiences diffraction and splits into three component beams. Two of the component beams are diffracted under angles $\pm\theta$ which can be found from the following equation for first order diffraction: $\Lambda \sin \theta = \lambda$ such that $\theta = \arcsin(\lambda/\Lambda)$. The third component beam is the remainder of the incident beam that is transmitted through the grating without diffraction. It is desirable to suppress the power of the transmitted portion of the incident beam. If the grating has a rectangular groove profile, the power and intensity of the transmitted portion can be controlled by groove depth D. If the grating is made from transparent material with a refractive index at fundamental wavelength (fundamental harmonic) of $n_{FH}$, the phase difference $\Delta\phi_{FH}$ for beams transmitted through the grooves and elevations of the grating may be calculated from the relationship: $\Delta\phi_{FH}=(2\pi/\lambda)\cdot(n_{FH}D-D)$. In this relationship, $(n_{FH}D-D)$ is the difference in optical paths of beams transmitted through the elevations and grooves. If $\Delta\phi_{FH}=\pi$ and the grating profile is symmetrical, i.e. the widths of elevations and grooves are equal to each other, the interaction of beams transmitted through the elevations and beams transmitted through the grooves results in destructive interference. This allows calculating the groove depth needed for suppression of transmitted beam from the following equations: $\pi=(2\pi/\lambda)\cdot(n_{FH}D-D)$ and therefore $D=\lambda/[2(n_{FH}-1)]$.

Under these same conditions, the interferences of positive and negative first order diffractions of the beams diffracted through the grooves and elevations are constructive. Therefore, substantially the entire power of the incident beam is distributed between two first order diffracted beams.

Using reflective mirrors properly positioned relative to the grating to conserve a phase relations between beams reflected from the mirrors allows combining the reflected beams in a direction opposite to the direction of the original incident beam. Thus, combining the reflective mirrors and the surface phase grating forms a diffractive outcoupler that operates as a highly reflective and spectrally selective mirror at fundamental wavelength of the incident radiation.

Analogous phase shift $\Delta\phi_{SH}$ for beams transmitted through grooves and elevations at the wavelength of second harmonic for the same grating may be obtained as follows: $\Delta\phi_{SH}=2[(n_{SH}-1)/(n_{FH}-1)]$ where nm and $n_{SH}$ are refractive indices of the grating at the wavelengths of fundamental and second harmonics, respectively. These refractive indices are usually quite similar. For instance, for fused silica with a refractive index of ~1.45 at 1060 nm, the difference between the two refractive indices is approximately 0.01. Therefore, the phase shift would be approximately 360 degrees ($\Delta\phi_{SH}\approx 2\pi$) with an accuracy of approximately 2% in the considered example. As a result, the interaction of second harmonic beams that are transmitted through the elevations and the grooves of the grating results in substantially complete constructive interference. On the other hand, the interferences of the first order diffracted beams that are diffracted through the grooves and elevations at the wavelength of second harmonic are destructive. This means that the intensities of the first order diffractions at the wavelength of second harmonic will be close to zero and the beam power is concentrated in transmitted beam at the second harmonic.

Figure 2:
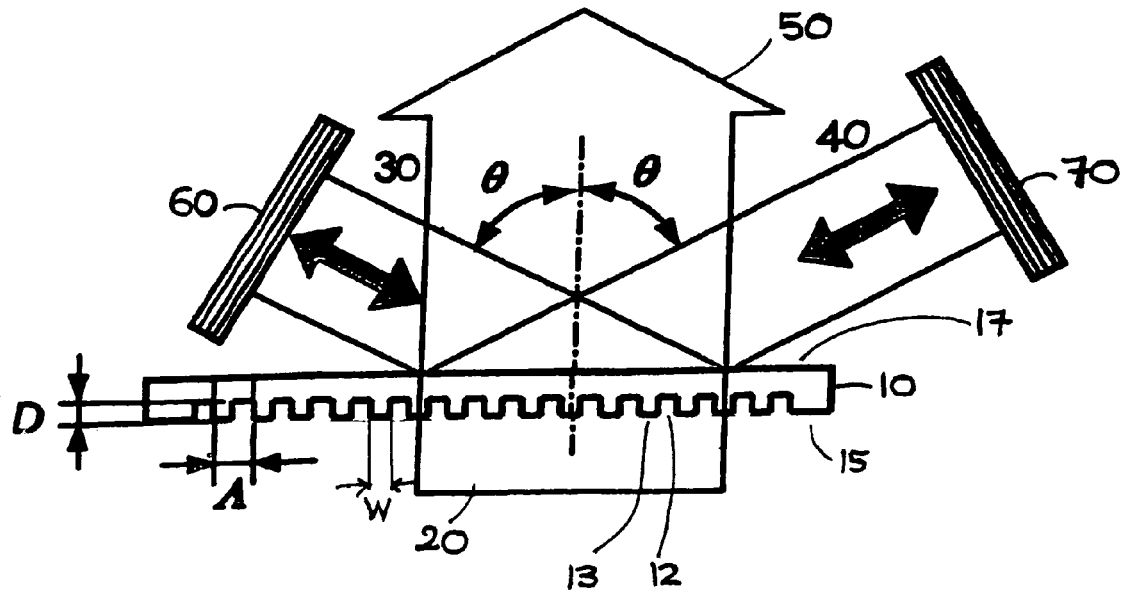
FIG. 2 is a schematic side view of another embodiment of a diffractive outcoupler according to the present invention.

FIG. 1 and FIG. 2 show two embodiments of a diffractive outcoupler for use in a cavity of a laser. The diffractive outcouplers of both FIG. 1 and FIG. 2 include a transparent substrate 10, a first reflector 60, and a second reflector 70. The transparent substrate 10 includes a surface phase grating 15 on one side and a flat surface 17 on the other side. In the diffractive outcoupler of FIG. 1, the grating side of the transparent substrate 10 is facing the reflectors 60, 70. In the diffractive outcoupler of FIG. 2, the grating side of the transparent substrate 10 is facing away from the reflectors 60, 70.

The surface phase grating 15, on one side of the transparent substrate 10, is formed by multiple rectangular grooves 12 with a depth D that are formed in a periodical manner. The flat surface 17, on the other side of the transparent substrate 10, may have an antireflection coating. The areas on the surface phase grating 15 between the grooves 12 are nongrooved areas or elevations 13. If a beam of light 20, such as a laser beam, having a fundamental wavelength of $\lambda$ is transmitted toward either the flat surface (FIG. 1) or the grooved surface (FIG. 2) of the substrate 10 at an angle normal to the flat surface, the beam 20 experiences diffraction and splits into three beams. One beam 50 transmits through the grating 15 without diffraction and exits the grating at an angle normal to the grating surface. Two of the beams 30, 40 are diffracted and exit the grating 15 at an angle $\theta$ from the normal. The angle of diffraction $\theta$ is determined by $\Lambda \sin \theta = \lambda$, where $\Lambda$ is the grating period at which the grooves are located on the grating 15. In the embodiments shown, the grooves 12 have substantially the same width was the distances between any two adjacent grooves or two adjacent elevations of the grating 15, i.e., $\Lambda=2w$.

Some portions of the beam 20 travel through the grooves 12 and are phase shifted according to the thickness of the substrate 10 in the grooved areas through which they travel. Because the other portions of the beam 20 travel through the nongrooved 13 and therefore thicker areas of the substrate 10, the phase of these portions of the beam 20 are shifted by a different amount.

In these embodiments, the thickness difference between the grooved and the nongrooved areas 12, 13 of the substrate 10, i.e., the depth D of the grooves 12, is substantially equal to $\lambda/(2(n_{FH}-1))$, where $n_{FH}$ is the index of refraction, or refractive index, of the transparent material forming the grating 15 at the fundamental wavelength $\lambda$. However, the depth D may also be set to $\lambda(k+1/2)/(n_{FH}-1)$, where k is any nonnegative integer, to achieve the same phase difference between the portions passing through the grooves and the elevations.

If the beam 20 received by the grating 15 has the frequency of the first and fundamental harmonic $\lambda$, the phase difference between the portion of the transmitted beam 50 traveling through the grooves 12 and the portion of the transmitted beam 50 traveling though the nongrooved areas 13 is substantially equal to $\pi$. This results in destructive interference between the two portions of the transmitted beam 50 at the fundamental frequency. Conversely, the phase shifting of the diffracted beams 30, 40 through the grooved and the nongrooved areas 12, 13 of the grating 15 results in constructive interference of the diffracted beams 30, 40. Thus, at the fundamental wavelength $\lambda$, the intensity of the transmitted beam 50 is near zero and the power of the original beam 20 is distributed between the diffracted beams 30, 40.

The first reflector 60 is located to receive a first diffracted beam 30 from the grating 15 and to conserve the phase relations between the portions traveling through the grooves 12 and the nongrooved areas 13. In the embodiments shown in FIG. 1 and FIG. 2, the first reflector 60 may be implemented by a total reflective mirror that reflects the first diffracted beam 30 back through the grating 15 to be diffracted in a direction opposite to the beam 20. Likewise, the second reflector 70 may be a total reflective mirror and effects the same reflection of the second diffracted beam 40. The proper disposition of the reflectors 60 and 70 relative to the grating 15 secures the phase relations of the reflected beams 30 and 40 in the direction back to the original beam 20. As a result, the two reflected beams may constructively interfere once they are diffracted back through the grating 15 in the direction opposite the direction of the beam 20. Thus, at the fundamental wavelength $\lambda$, the grating 15 on the substrate 10 and the reflectors 60, 70 act as a high-reflective and spectral-selective mirror.

If the beam 20 received by the grating 15 has the frequency of the second harmonic $\lambda/2$, however, the phase difference between the portions of the beam passing through the grating changes. Portions of the transmitted beam 50 that have traveled through the grooves 12 have a phase that differs by about $2\pi$ from the portions of the transmitted beam 50 that have traveled through the nongrooved areas 13, assuming that the refractive index at the fundamental frequency differs very little from the refractive index at the second harmonic frequency. In the case of fused silica, for example, these indices of refraction differ by about 0.01 with a refractive index of approximately 1.45 at 1060 nm, and the two portions of the transmitted beam 50 almost completely constructively interfere. Conversely, the two portions of each of the diffracted beams 30, 40 almost completely destructively interfere at the second harmonic frequency. Thus, when the beam 20 received by the grating 15 has the frequency of the second harmonic $\lambda/2$, substantially all of the beam 20 is transmitted as beam 50.

In alternative embodiments, various types of spectrally selective reflectors may be used in place of the reflective elements 60 and 70 in FIG. 1 and FIG. 2. These reflectors should improve the spectral selectivity of outcoupler without influencing transmission and reflection of beams at wavelengths of fundamental and second harmonics. Thus, although the reflectors 60, 70 are described as total reflective mirrors, other highly reflective devices such as prisms, diffractive or Bragg gratings, etc., can be used to reflect the diffracted beam.

Figure 3:
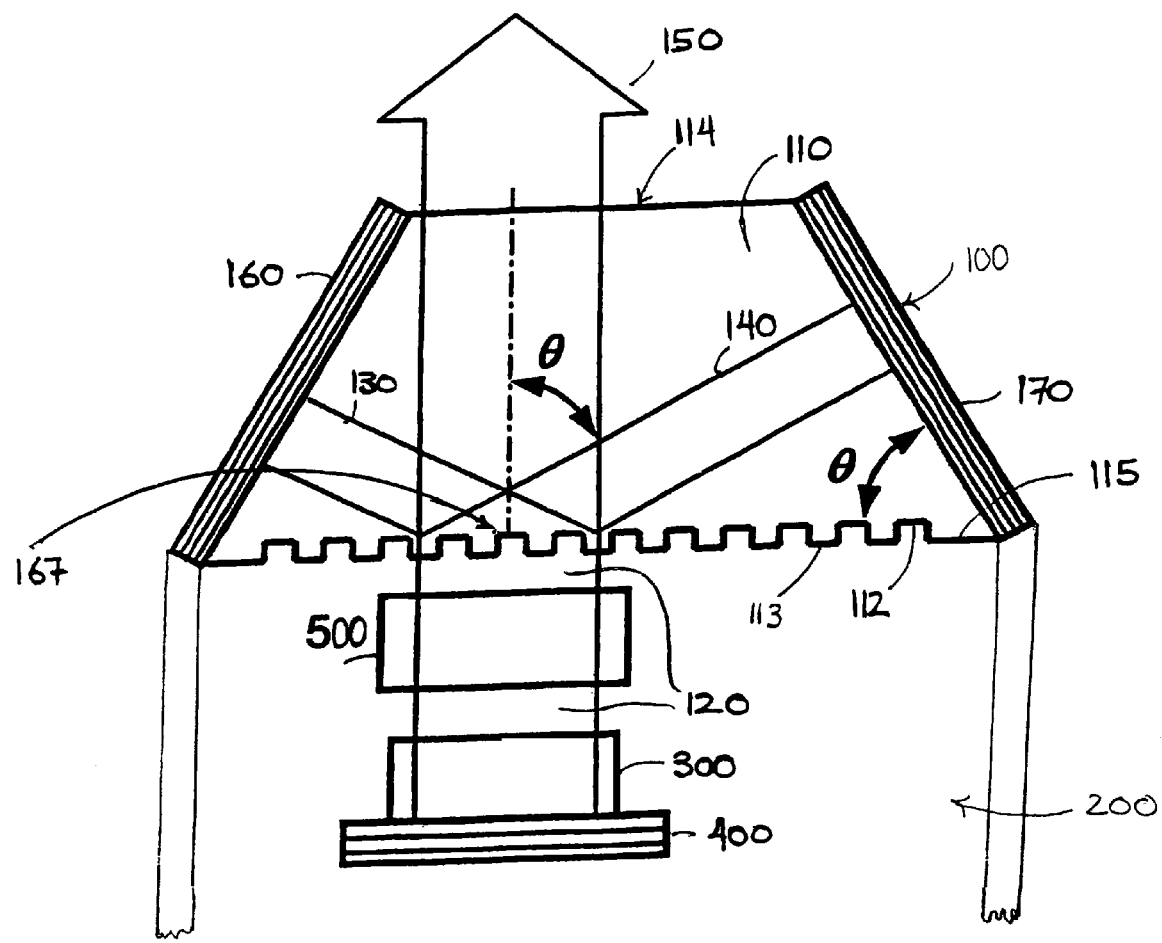
FIG. 3 is a schematic side view of one embodiment of a second harmonic generating system according to the present invention.

FIG. 3 is a schematic side view of one embodiment of a second harmonic generating system according to the present invention. The second harmonic generating system includes an outcoupler 100 and a cavity 200 where laser radiation is generated. The exemplary outcoupler described can be used as one laser end mirror for the intracavity second harmonic generation system that is shown in FIG. 3.

The outcoupler may be made from a single trapezoidal block of transparent material as a substrate. The transparent material used for the substrate may be fused silica. The transparent substrate may have a grating on one of its surfaces, an antireflection coating at the wavelength of second harmonic of the laser on an opposite surface, and total reflectors at the fundamental wavelength of the laser on the side surfaces. Angles at the side of the trapezoidal block where the grating is formed are set equal to the angle of beam diffraction $\theta$ through the grating at fundamental wavelength $\lambda$ of the laser to provide accurate reflection of diffracted beams. If a beam propagates inside the trapezoidal block with refractive index n, $\theta=\arcsin[\lambda/(n\Lambda)]$ where $\Lambda$ is the period or twice the width of a groove of the grating.

A nonlinear crystal for second harmonic generation and an active media are placed between this outcoupler and a total mirror on the other side of the active media. The angular dispersion of the grating can be found from the relationship $d\theta/d\lambda=\tan\theta/\lambda$. According to this relationship, dispersion is increased with the angle of diffraction. This relationship provides a method for adjustment of grating parameters with the required design of laser. In addition, this equation shows that spectral selectivity $d\lambda$ of the outcoupler is higher for low divergent beams when $d\theta$ is small, i.e. the outcoupler has better spectral selectivity at lowest laser transversal mode. The spectral selectivity or spectral resolution $d\lambda$ of a diffraction grating for the first order diffraction is proportional to the total number of grooves N involved in diffraction according to the relationships: $\lambda/d\lambda=N=\omega_0/\Lambda$ and $d\lambda=(\lambda\Lambda)/\omega_0=\lambda^2/(\omega_0 \sin\theta)$ where $\omega_0$ is a beam diameter. For example, in the case of a semiconductor laser with a beam diameter of about 100-200 μm, the spectral selectivity $d\lambda$ is not very high and it is of the order of 5-10 nm for large angles of diffraction. Nevertheless, such a selectivity allows reaching a narrowband oscillation from semiconductor lasers taking into account that the outcoupler of the embodiments of the present invention has a bell-shaped reflection as opposed to a flattop reflection. The outcoupler of the embodiments of the present invention is therefore capable of providing an efficient spectral selection even in the case of semiconductor lasers with small beam diameters.

Referring to FIG. 3, an embodiment of a second harmonic generation system includes a diffractive outcoupler 100 within a cavity 200. The diffractive outcoupler 100 has a substrate 110 that may be constructed from fused silica and includes a grating 115 with a series of rectangular grooves 112 with a depth D satisfying the relation discussed above. The substrate 110 is located substantially perpendicular to the longitudinal axis of the cavity 200. The side of the substrate 110 opposite to the grooves 112 includes an antireflection coating 114 to suppress the back reflection of the transmitted beam 150 at the second harmonic wavelength $\lambda/2$.

Reflectors 160 and 170 are coupled to the lateral sides of the grating 115 at an angle equal to a diffraction angle θ of first and second diffracted beams 130, 140. Substantial matching of the angle of first order diffraction allows the reflectors 160, 170 to receive the diffracted beams 130, 140 at an angle normal to their respective surfaces. The reflectors 160, 170 can thus reflect the diffracted beams 130, 140 back to the same location 167 at which the original beam 120 entered the grating 115. The diffractive outcoupler 100 can thus be used as a highly efficient end mirror in an intracavity second harmonic generation system.

An active element 300 is located within the cavity 200 for generating radiation. The active element 300 may be a laser source. A reflector 400 within the cavity 200 is proximate to a first side of the active element 300. A harmonic generator 500, such as a nonlinear crystal, is located within the cavity 200 proximate to an opposite side of the active element 300. The harmonic generator 500 receives the radiation 120 from the active element 300 and transmits the radiation 120, including radiation at the second harmonic frequency, to the diffractive outcoupler 100.

As discussed above, the beam 120 is received by the grating 115 and is separated into a transmitted beam 150 and the diffracted beams 130, 140. The transmitted beam 150 has portions that travel through grooves 112 of the grating 115 and portions that travel through nongrooved areas or elevations 113 of the grating 115. When the beam 120 has a frequency equal to the fundamental wavelength λ, the portions of the transmitted beam 150 that have traveled though the grooves 112 destructively interfere with the portions that have traveled through the elevations 113 and the intensity of the transmitted beam 150 approaches zero.

Conversely, portions of the diffracted beams 130, 140 that have traveled through the grooves 112 constructively interfere with the portions that have traveled through the elevations 113. The diffracted beams 130, 140 are reflected back by the reflectors 160, 170 and proceed out of the diffractive outcoupler 100 back into the cavity 200 in a direction opposite to the direction of the original beam 120. The diffracted beams 130, 140 are then reflected by the reflector 400 to travel back through the second harmonic generator 500 and toward the diffractive outcoupler 100.

The angular dispersion of the grating 115, which follows the equation $d\theta/d\lambda = \tan\theta/\lambda$, is increased with the angle of diffraction θ. Grating parameters can thus be adjusted with the required design of the laser. Further, spectral selectivity dλ of the outcoupler is higher for low divergent beams when dθ is small. Thus, the outcoupler has a better spectral selectivity at the lowest laser transversal mode.

This embodiment of an optical outcoupler has a much narrower bandwidth than conventional end mirrors and has a bell-shaped, rather than flat-topped, spectral reflection at the fundamental wavelength. This indicates that the outcoupler will provide efficient spectral selection, even in the case of semiconductor lasers with small beam diameters.

The embodiment shown in FIG. 3 may be considered as having a composite cavity including two sub-cavities. One sub-cavity may be formed by the reflector 400, the grating 150, and the reflector 160 while the other sub-cavity is formed by the reflector 400, the grating 150, and the reflector 170. The distances between the grating 150 and the reflectors 160, 170 may be varied. This allows adjusting phase relations between the beams in cavities and facilitates the beam spectral narrowing.

Figure 4:
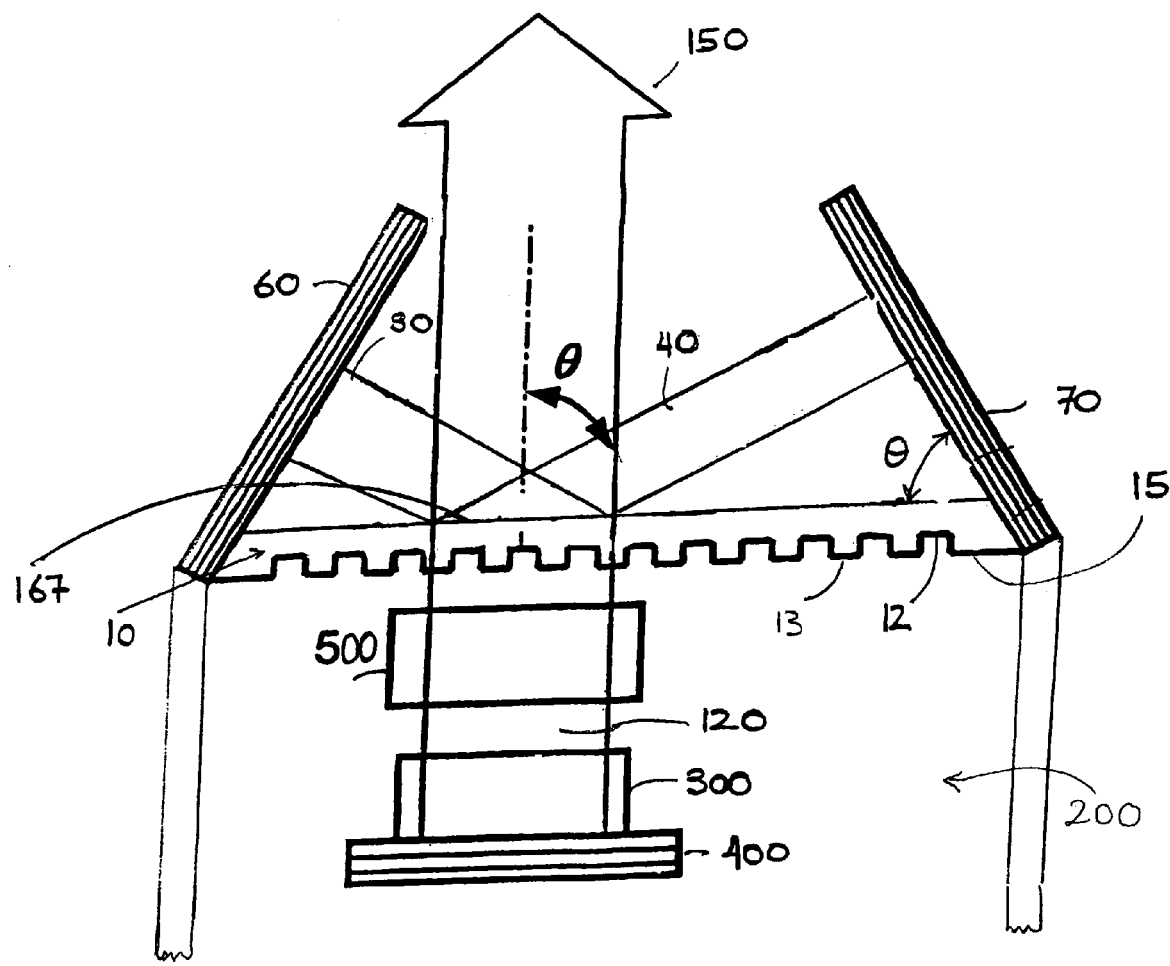
FIG. 4 is a schematic side view of another embodiment of a second harmonic generating system according to the present invention using a cavity of FIG. 3 and the diffractive outcoupler of FIG. 1.

FIG. 4 is a schematic side view of another embodiment of a second harmonic generating system according to the present invention. The system of FIG. 4 combines the diffractive outcoupler of FIG. 2 and the cavity shown in FIG. 3, both of which have been described above. A detailed description of FIG. 4, is therefore omitted.

Although the present invention has been described with reference to certain exemplary embodiments, it is understood that a variety of modifications and variations may be made to the present invention without departing from the spirit or scope of the invention defined in the appended claims, and their equivalents.

What is claimed is:

1. A diffractive outcoupler for use in a cavity of a laser, the diffractive outcoupler comprising:
    a transparent substrate having a first side and a second side;
    a surface phase grating including rectangular grooves having a groove depth D formed on the first side, the surface phase grating dividing incident radiation into a transmitted portion, a first diffracted portion, and a second diffracted portion;
    a first reflector situated with respect to the transparent substrate for receiving the first diffracted portion from the surface phase grating and reflecting the first diffracted portion back toward the surface phase grating; and
    a second reflector situated with respect to the transparent substrate for receiving the second diffracted portion from the surface phase grating and for reflecting the second diffracted portion back toward the surface phase grating,
    wherein the groove depth D substantially satisfies the relation $D=\lambda(k+1/2)/(n_{FH}-1)$, where k is a nonnegative integer, λ is a fundamental wavelength of the incident radiation, and $n_{FH}$ is refractive index of the transparent substrate at the fundamental wavelength λ.

2. The diffractive outcoupler of claim 1, wherein the second side is substantially flat.

3. The diffractive outcoupler of claim 1, wherein the second side comprises an antireflection coating at a second harmonic wavelength of the incident radiation.

4. The diffractive outcoupler of claim 1, wherein the first reflector and the second reflector are each selected from a mirror, a prism, a diffractive grating, or a Bragg grating.

5. The diffractive outcoupler of claim 1, wherein the first side is positioned to receive the incident radiation and the second side is positioned to receive radiation reflected back from the first reflector and the second reflector.

6. The diffractive outcoupler of claim 1, wherein the second side is positioned to receive the incident radiation and the first side is positioned to receive radiation reflected back from the first reflector and the second reflector.

7. The diffractive outcoupler of claim 1, wherein adjacent ones of the rectangular grooves having a groove width w are separated by a distance of about w from each other.

8. The diffractive outcoupler of claim 1,
    wherein the first reflector is positioned with respect to the transparent substrate to receive the first diffracted portion at an angle approximately normal to a surface of the first reflector, and
    wherein the second reflector is positioned with respect the transparent substrate to receive the second diffracted portion at an angle approximately normal to a surface of the second reflector.

9. The diffractive outcoupler of claim 8, wherein the first reflector and the second reflector are respectively fixed to a third side and a fourth side of the transparent substrate.

10. The diffractive outcoupler of claim 8,
wherein the transparent substrate is a substantially trapezoidal prism, having a third side and a fourth side being non-parallel to the third side, and
wherein the first reflector and the second reflector are fixed respectively to the third side and the fourth side of the transparent substrate.

11. A second harmonic generation system comprising:
a cavity;
an active element located within the cavity for generating radiation;
a first reflector located within the cavity adjacent a first side of the active element;
a harmonic generator located within the cavity adjacent a second side of the active element, the harmonic generator located to receive the radiation from the active element;
a substrate having a first substrate side and a second substrate side opposite the first substrate side, the first substrate side including a surface phase grating for receiving the radiation from the harmonic generator, the surface phase grating including rectangular grooves having a groove depth D;
a second reflector located to receive a first diffracted portion of the radiation from the surface phase grating and to reflect the first diffracted portion back toward the surface phase grating; and
a third reflector located to receive a second diffracted portion of the radiation from the surface phase grating and to reflect the second diffracted portion back toward the surface phase grating,
wherein the groove depth D substantially satisfies the relation $D=\lambda(k+1/2)/(n_{FH}-1)$, where k is a nonnegative integer, $\lambda$ is a fundamental wavelength of the radiation, and $n_{FH}$ is refractive index of the substrate at the fundamental wavelength.

12. The second harmonic generation system of claim 11,
wherein the surface phase grating further includes non-grooved areas between adjacent grooves, and
wherein the grooves are located for causing radiation diffracting through the grooves and radiation diffracting through the non-grooved areas to constructively interfere at the fundamental wavelength of $\lambda$ and destructively interfere at half the fundamental wavelength $\lambda/2$.

13. The second harmonic generation system of claim 11, wherein the second substrate side is substantially flat and includes an antireflection coating at a second harmonic wavelength.

14. The second harmonic generation system of claim 11, wherein the surface phase grating is located substantially perpendicular to an axis of the cavity.

15. The second harmonic generation system of claim 11, wherein the first substrate side is positioned to receive the radiation from the harmonic generator and the second substrate side is positioned to receive reflected radiation back from the second reflector and the third reflector.

16. The second harmonic generation system of claim 11, wherein the grooves have a groove width w and are separated by a distance of about w from an adjacent groove.

17. The second harmonic generation system of claim 11, wherein the second reflector and the third reflector are located with respect to the substrate at an angle sufficient to receive the first diffracted portion and the second diffracted portion at angles approximately normal to respective surfaces of the second reflector and the third reflector.

18. The second harmonic generation system of claim 11, wherein the substrate is substantially shaped as a trapezoidal prism.

19. The second harmonic generation system of claim 18, wherein the second reflector and the third reflector are respectively fixed to a third substrate side and a fourth substrate side, the third substrate side and the fourth substrate side being non-parallel sides of the trapezoidal prism.

20. A method for spectral selection of second harmonic from radiation generated at fundamental harmonic by laser sources, the method comprising:
transmitting the radiation onto a transparent substrate having a first side and a second side and a surface phase grating including rectangular grooves having a groove depth D formed on the first side, the surface phase grating dividing the radiation into a transmitted portion, a first diffracted portion, and a second diffracted portion;
reflecting the first diffracted portion back toward the surface phase grating by a first reflector; and
reflecting the second diffracted portion back toward the surface phase grating by a second reflector,
wherein the groove depth D substantially satisfies the relation $D=\lambda(k+1/2)/(n_{FH}-1)$, where k is a nonnegative integer, $\lambda$ is a fundamental wavelength of the radiation, and $n_{FH}$ is refractive index of the transparent substrate at the fundamental wavelength $\lambda$ of the radiation,
wherein the transmitted portion is substantially at a second harmonic frequency of the radiation, and
wherein intensity of the transmitted portion is substantially equal to intensity of the radiation transmitted onto the transparent substrate.

* * * * *